(12) United States Patent
Suk et al.

(10) Patent No.: US 12,008,770 B2
(45) Date of Patent: Jun. 11, 2024

(54) METHOD, SYSTEM, AND NON-TRANSITORY COMPUTER-READABLE RECORDING MEDIUM FOR MEASURING BALL SPIN

(71) Applicant: CREATZ INC., Suwon-si (KR)

(72) Inventors: Yong Ho Suk, Seongnam-si (KR); Jey Ho Suk, Seoul (KR); Hyeon Seok Choi, Seoul (KR)

(73) Assignee: CREATZ Inc., Suwon-si (KR)

( * ) Notice: Subject to any disclaimer, the term of this patent is extended or adjusted under 35 U.S.C. 154(b) by 565 days.

(21) Appl. No.: 17/204,310

(22) Filed: Mar. 17, 2021

(65) Prior Publication Data

US 2021/0220701 A1 Jul. 22, 2021

Related U.S. Application Data

(63) Continuation of application No. PCT/KR2021/000420, filed on Jan. 12, 2021.

(30) Foreign Application Priority Data

Jan. 16, 2020 (KR) .................. 10-2020-0006247
Oct. 30, 2020 (KR) .................. 10-2020-0143813

(51) Int. Cl.
*G06F 18/2113* (2023.01)
*A63B 24/00* (2006.01)
(Continued)

(52) U.S. Cl.
CPC .......... *G06T 7/246* (2017.01); *A63B 24/0006* (2013.01); *G06F 18/2113* (2023.01);
(Continued)

(58) Field of Classification Search
CPC ................ G06F 18/2113; A63B 69/36; A63B 2200/806; A63B 2024/0028
See application file for complete search history.

(56) References Cited

U.S. PATENT DOCUMENTS

2004/0032970 A1  2/2004 Kiraly
2010/0210377 A1  8/2010 Lock
(Continued)

FOREIGN PATENT DOCUMENTS

EP    3309741 A1    4/2018
JP   2013535715 A   9/2013
(Continued)

OTHER PUBLICATIONS

Imai, Yuta et al., "Estimation of a large relative rotation between two images of a fast spinning marker-less golf ball," 2016 IEEE/SICE International Symposium on System Integration (SII), Sapporo, Japan, 2016, pp. 556-561, Dec. 2016.

*Primary Examiner* — Thomas H Henry
(74) *Attorney, Agent, or Firm* — Dinsmore & Shohl LLP; Yongsok Choi, Esq.

(57) ABSTRACT

According to one aspect of the present invention, there is provided a method for measuring ball spin, the method comprising the steps of: detecting a plurality of dimples in each of a plurality of images of a ball for which physical quantities are to be measured; and measuring physical quantities related to spin of the ball with reference to a relationship between properties of the plurality of dimples detected in a first image among the plurality of images and properties of the plurality of dimples detected in a second image among the plurality of images.

11 Claims, 6 Drawing Sheets

(51) Int. Cl.
  *G06T 7/246* (2017.01)
  *G06V 10/24* (2022.01)
  *G06V 10/75* (2022.01)
  *G06V 20/00* (2022.01)

(52) U.S. Cl.
  CPC .......... *G06V 10/242* (2022.01); *G06V 10/751* (2022.01); *G06V 20/00* (2022.01); *A63B 2220/806* (2013.01)

(56) References Cited

U.S. PATENT DOCUMENTS

| | | | |
|---|---|---|---|
| 2015/0262011 A1* | 9/2015 | Keat | G06T 3/0037 382/103 |
| 2019/0292575 A1* | 9/2019 | Murtaza | C12Q 1/6855 |
| 2020/0019809 A1* | 1/2020 | Guigues | G06V 40/28 |

FOREIGN PATENT DOCUMENTS

| | | | |
|---|---|---|---|
| JP | 2018525043 A | 9/2018 |
| JP | 6500598 B2 | 4/2019 |
| JP | 2019054951 A | 4/2019 |
| KR | 1020090112538 A | 10/2009 |
| KR | 101019829 B1 | 3/2011 |
| KR | 101723432 B1 | 4/2017 |
| KR | 1020180138075 A | 12/2018 |

* cited by examiner

METHOD, SYSTEM, AND NON-TRANSITORY COMPUTER-READABLE RECORDING MEDIUM FOR MEASURING BALL SPIN

CROSS-REFERENCE TO RELATED APPLICATION(S)

This application is a continuation application of Patent Cooperation Treaty (PCT) International Application No. PCT/KR2021/000420 filed on Jan. 12, 2021, which claims priority to Korean Patent Application Nos. 10-2020-0006247 and 10-2020-0143813 filed on Jan. 16 and Oct. 30, 2020. The entire contents of PCT International Application No. PCT/KR2021/000420 and Korean Patent Application Nos. 10-2020-0006247 and 10-2020-0143813 are hereby incorporated by reference.

FIELD OF THE INVENTION

The present invention relates to a method, system, and non-transitory computer-readable recording medium for measuring ball spin.

BACKGROUND

Virtual golf systems are widely spreading which allow golfers to virtually play golf at low cost in downtown areas and the like. The basic concept of such virtual golf systems is to acquire a number of images of a golf ball when the golf ball is hit by a golfer, measure physical quantities of the golf ball on the basis of a trajectory, interval, size, and the like thereof, and perform a simulation of the shot to display a result of the simulation on a screen. In the virtual golf systems, it is of paramount importance to acquire the images of the golf ball in as good condition as possible.

In this connection, Korean Laid-Open Patent Publication No. 10-2009-0112538 discloses a technique for more diversely acquiring images of a golf ball by photographing a golf practice scene while adjusting a location or color of illumination (the entire content of the publication is to be regarded as being incorporated herein by reference in its entirety). However, although several conventional techniques including the above are necessary in order to acquire golf ball images required to accurately measure physical quantities of a golf ball in good condition, there is actually no interest in a technique for measuring physical quantities related to spin of a golf ball using dimples that can be obtained from a plurality of images of the golf ball.

The inventor(s) present a novel and inventive technique capable of accurately measuring physical quantities related to spin of a golf ball by analyzing dimples detected in a plurality of images of the golf ball acquired from a camera.

SUMMARY OF THE INVENTION

One object of the present invention is to solve all the above-described problems in the prior art.

Another object of the invention is to easily and accurately measure physical quantities related to spin of a ball by analyzing dimples appearing over a plurality of images of the ball.

Yet another object of the invention is to accurately measure physical quantities related to spin of a ball even when there are no marks on the ball for which the physical quantities are to be measured.

The representative configurations of the invention to achieve the above objects are described below.

According to one aspect of the invention, there is provided a method for measuring ball spin, the method comprising the steps of: detecting a plurality of dimples in each of a plurality of images of a ball for which physical quantities are to be measured; and measuring physical quantities related to spin of the ball with reference to a relationship between properties of the plurality of dimples detected in a first image among the plurality of images and properties of the plurality of dimples detected in a second image among the plurality of images.

According to another aspect of the invention, there is provided a system for measuring ball spin, the system comprising: a dimple detection management unit configured to detect a plurality of dimples in each of a plurality of images of a ball for which physical quantities are to be measured; and a physical quantity measurement unit configured to measure physical quantities related to spin of the ball with reference to a relationship between properties of the plurality of dimples detected in a first image among the plurality of images and properties of the plurality of dimples detected in a second image among the plurality of images.

In addition, there are further provided other methods and systems to implement the invention, as well as non-transitory computer-readable recording media having stored thereon computer programs for executing the methods.

According to the invention, it is possible to is to easily and accurately measure physical quantities related to spin of a ball by analyzing dimples appearing over a plurality of images of the ball.

According to the invention, it is possible to accurately measure physical quantities related to spin of a ball even when there are no marks on the ball for which the physical quantities are to be measured.

DETAILED DESCRIPTION

Figure 1:
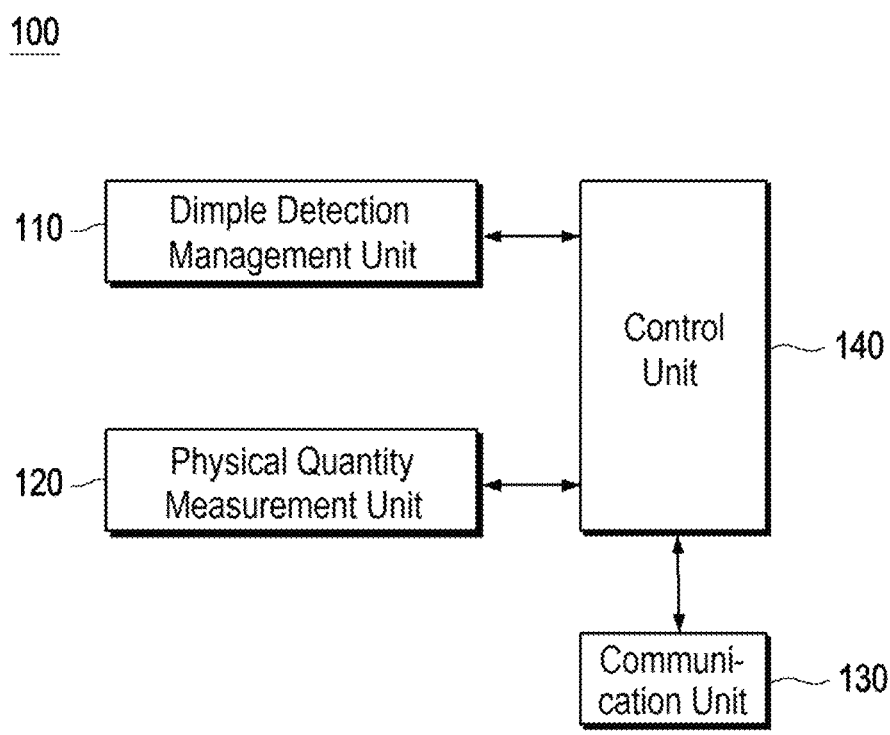
FIG. 1 specifically shows the internal configuration of a measurement system according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of a Measurement System

FIG. 1 specifically shows the internal configuration of a measurement system 100 according to one embodiment of the invention.

Referring to FIG. 1, the measurement system 100 may comprise a dimple detection management unit 110, a physical quantity measurement unit 120, a communication unit 130, and a control unit 140. According to one embodiment of the invention, at least some of the dimple detection management unit 110, the physical quantity measurement unit 120, the communication unit 130, and the control unit 140 may be program modules that communicate with an external system (not shown). The program modules may be included in the measurement system 100 in the form of operating systems, application program modules, and other program modules, while they may be physically stored in a variety of commonly known storage devices. Further, the program modules may also be stored in a remote storage device that may communicate with the measurement system 100. Meanwhile, such program modules may include, but not limited to, routines, subroutines, programs, objects, components, and data structures for performing specific tasks or executing specific abstract data types according to the invention as will be described below.

Meanwhile, the above description is illustrative although the measurement system 100 has been described as above, and it will be apparent to those skilled in the art that at least a part of the functions or components of the measurement system 100 may be implemented or included in a known virtual golf simulation system, as necessary. Further, in some cases, all the functions and components of the measurement system 100 may be implemented or included in a known virtual golf simulation system.

First, the dimple detection management unit 110 according to one embodiment of the invention may function to detect a plurality of dimples in each of a plurality of images of a ball for which physical quantities are to be measured.

For example, the dimple detection management unit 110 may perform preprocessing for each of the plurality of images to improve discrimination of the plurality of dimples, and detect the plurality of dimples on the basis of the plurality of preprocessed images.

More specifically, the dimple detection management unit 110 may perform at least one preprocessing among blur, histogram equalization, contrast, adaptive thresholding binarization, and morphology for each of a plurality of images 201 to enable stabilization, noise removal, quality improvement, and the like of the plurality of images. Meanwhile, the above preprocessing procedures may be performed on the basis of a window of a size equal to or similar to the size of the dimple of the ball. For example, on the basis of at least one filter (e.g., a filter for at least one processing among blur, contrast, adaptive threshold binarization, and morphology) having a window of a size equal to or similar to the size of the dimple of the ball, processing (e.g., a convolution operation between the filter and each of the images) may be performed for each of the plurality of images (or around areas estimated to be the dimples in each of the images).

Figure 2:
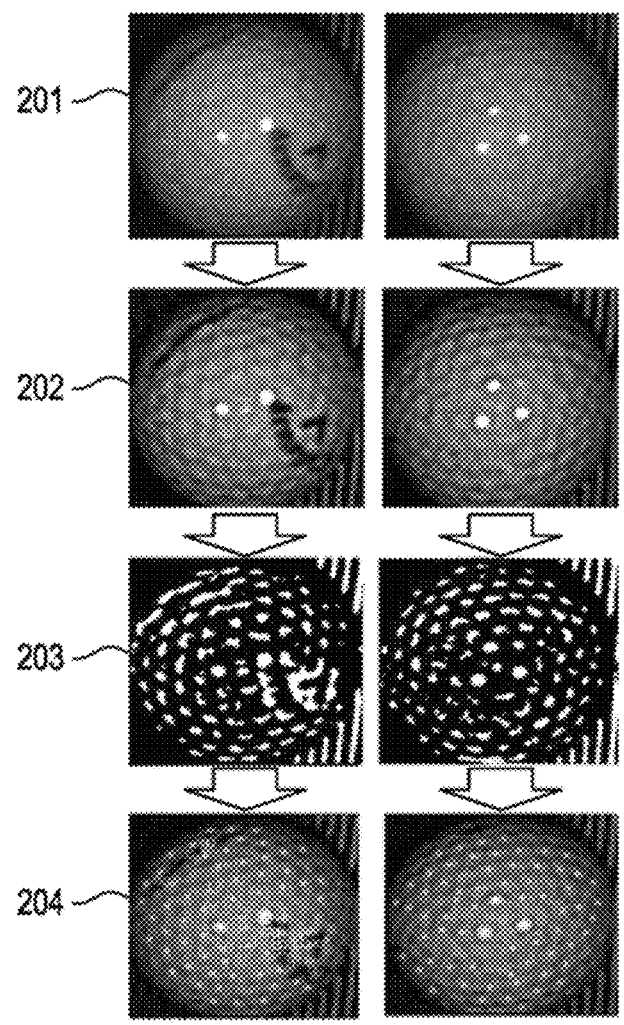
FIG. 2 illustratively show preprocessing procedures that may be performed for each of a plurality of images to detect dimples of a ball according to one embodiment of the invention.
Figure 3:
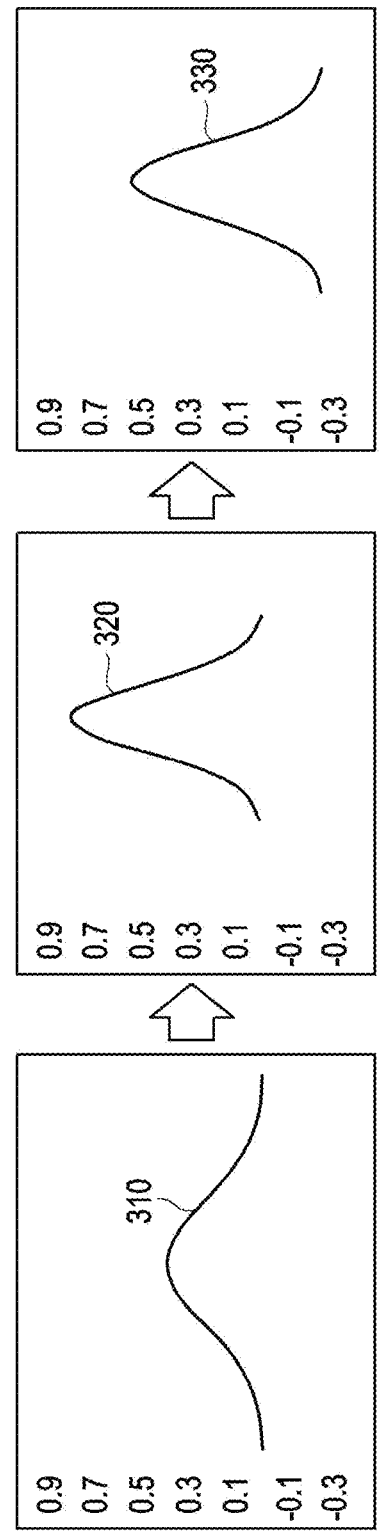
FIG. 3 illustratively show preprocessing procedures that may be performed for each of a plurality of images to detect dimples of a ball according to one embodiment of the invention.
Figure 4:
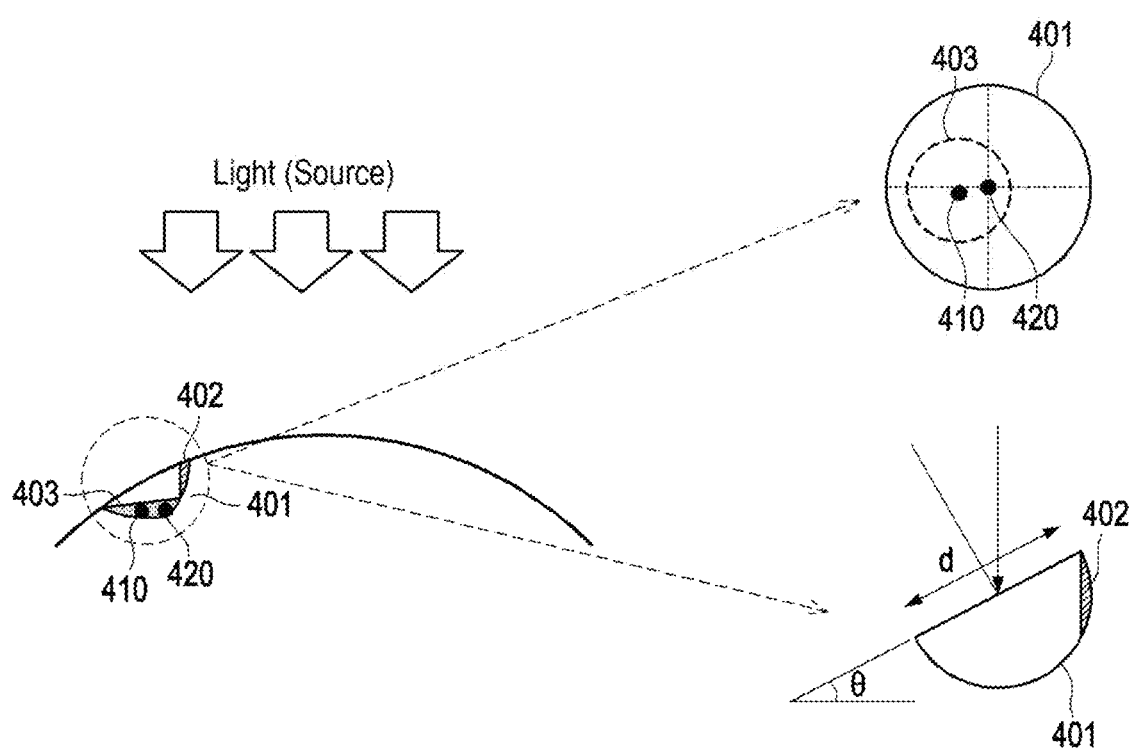
FIG. 4 illustratively show preprocessing procedures that may be performed for each of a plurality of images to detect dimples of a ball according to one embodiment of the invention.

For example, the preprocessing procedures performed for each of the plurality of images 201 according to one embodiment of the invention will be described in detail with reference to FIG. 2. (1) First, the dimple detection management unit 110 may perform blur processing for each of the plurality of images 201 to reduce noise. (2) Next, the dimple detection management unit 110 may perform contrast processing for each of the plurality of images to increase contrast while maintaining brightness of an original image (202). The contrast processing will be described in detail with reference to FIG. 3. The contrast processing may be performed such that contrast is increased while average brightness is maintained in each of the plurality of images, by applying a filter obtained by increasing the size of the central part (specifically, the center and its surroundings) of a Gaussian filter (specifically, a normal Gaussian filter) 310 for contrast processing at a predetermined level (320) and offsetting the Gaussian filter (e.g., displacing the filter in parallel in the negative direction) such that the overall distribution average of the filter may be maintained at a predetermined level (e.g., at 0 or 1, or at the same level as before increasing the size as above) (330). (3) Next, the dimple detection management unit 110 may perform adaptive threshold binarization processing for each of the plurality of images (specifically, around each dimple area in each of the images) (203). For example, each dimple area may be more clearly specified by analyzing pixel brightness around the adjacent area of each dimple (e.g., calculating brightness average for the surroundings of each pixel at an adaptive threshold of each dimple specified in each of the plurality of images, and calculating a threshold value of each dimple on the basis of the brightness average) to perform the binarization processing. Meanwhile, it is possible to reduce computational load by performing the processing on the basis of information on an accumulation map that may be accumulated and managed for the entire area, instead of recalculating a sum for calculating the brightness average in the course of analyzing the pixel brightness. (4) Next, the dimple detection management unit 110 may perform a morphology operation for each of the plurality of images such that each dimple area is more clearly shown in each of the plurality of images. (5) Next, the dimple detection management unit 110 may detect a plurality of dimples (specifically, respective positions of the dimples in the ball image) on the basis of bright areas in each of the plurality of images (204), because the areas corresponding to the dimples of the ball are shown to be brighter than other areas in each of the plurality of images due to light applied to the ball in the course of photographing the ball (e.g., infrared LED illumination or sunlight applied for camera photographing). (6) Meanwhile, the dimple detection management unit 110 may correct the positions of the dimples in each of the plurality of images on the basis of a direction in which the light is applied to the ball detected in each of the plurality of images. For example, referring to FIG. 4, when a plurality of dimples 401 are detected on the basis of bright areas in each of the plurality of images, positions 410 of the dimples detected in each of the plurality of images may have errors compared to actual positions 420 of the dimples due to the shape of the ball (or the dimples 401) depending on the direction in which the light is applied to the ball. For example, as an angle between the direction in which the light is applied and a normal line of each dimple 401 increases due to the curvature or the like of the ball and the dimple 401, a dark area (i.e., an area where the light does not reach) 402 increases and a bright area 403 decreases so that the position 410 of the center of the bright area 403 has a larger error with respect to the position 420 of the actual center of the dimple. Accordingly, the dimple detection management unit 110 may more accurately specify the position of each dimple 401 in each of the plurality of images by applying a predetermined offset to the position of the dimple 401 detected as above (specifically, the position of the center of the bright area 403) on the basis of the direction in which the light is applied. More specifically, the position of each dimple 401 may be more accurately detected in each of the plurality of images by applying an offset such that the position 410 of the center of the bright area coincides with the position 420 of the actual center of the dimple in each of the plurality of images, with respect to an angle θ between a diameter d (or a radius) and the opening of the dimple 401 and a predetermined point (e.g., the ground). Meanwhile, the size of the offset may be specified on the basis of a sine or cosine function (e.g., k·d·sin(2θ)/4, where k is a predetermined weight). Meanwhile, when an additional light source (e.g., sunlight) is present, the positions of the dimples may be corrected with further reference to the position of the additional light source. For example, when sunlight is applied in addition to indoor illumination (e.g., outdoors), the positions of the dimples detected in the plurality of images may be further corrected by performing procedures similar to those described above, with reference to a position in which the sunlight is applied (e.g., the position is specified with reference to information on the altitude of the sun). Meanwhile, when indoor illumination is not used and only sunlight is applied, the positions of the dimples may be corrected by considering only a position in which the sunlight is applied.

Meanwhile, when at least one mark (e.g., a logo) appearing in an area corresponding to the ball for which the physical quantities are to be measured is detected in each of the plurality of images of the ball, the dimple detection management unit 110 may specify the at least one mark as at least one dimple.

For example, the dimple detection management unit 110 may fragment the edge of the detected mark to an extent similar to an average distance between the dimples, and process each fragment to represent one dimple, so that the mark may be specified in the same manner as the above-described dimples. In this case, since the positions of the dimples may be specified differently depending on a start reference point for dividing the mark into the dimples, a start point for fragmenting the edge may be specified with reference to a point where the effect of spin of the ball may be minimized (e.g., the point may be determined with reference to a maximum curvature point and a minimum curvature point).

Since the at least one mark detected in each of the plurality of images usually has a dark color and shows little difference in brightness unlike the dimples, it is somewhat difficult to specify dimples from the corresponding area. However, the at least one mark may be utilized in the same manner as the dimples, and thus a situation in which the number of dimples detected from the ball is small may be addressed.

Next, the physical quantity measurement unit 120 according to one embodiment of the invention may function to measure physical quantities related to spin of the ball with reference to a relationship between properties of the plurality of dimples detected in a first image among the plurality of images and properties of the plurality of dimples detected in a second image among the plurality of images. The properties of the dimples according to one embodiment of the invention may encompass a distance relationship, a position relationship, a direction relationship, and the like between the dimples. Further, according to one embodiment of the invention, the physical quantities related to spin of the ball may include information on a spin direction, a spin rate, a spin acceleration, an angular spin rate, a spin amount, and the like of the ball. However, it is noted that the physical quantities related to spin of the ball according to the invention are not necessarily limited to the above-described information, and may be diversely changed as long as the objects of the invention may be achieved. In addition, the relationship between the properties of the plurality of dimples according to one embodiment of the invention may indicate to what extent the properties of the plurality of dimples are physically, spatially, numerically, or logically identical or similar.

For example, the physical quantity measurement unit 120 may compare properties of at least one dimple pair specified from the plurality of dimples in the first image (the dimple pair may consist of at least two dimples) and properties of at least one dimple pair specified from the plurality of dimples in the second image to determine at least one first associated dimple pair on the basis of an extent to which the properties match with each other, and may measure the physical quantities related to spin of the ball with reference to rotation information of the at least one first associated dimple pair determined as above. According to one embodiment of the invention, the matching extent may be specified on the basis of various methods of calculating minimum error between the properties of the dimple pairs, such as root mean square error, mean absolute value percent error, and singular value matrix decomposition. However, it is noted that the methods of specifying the matching extent according to the invention are not limited to the foregoing, and may be diversely changed to scoring (or weighted scoring) methods and the like as long as the objects of the invention may be achieved. In addition, the first associated dimple pair according to one embodiment of the invention may comprise a dimple pair in each of at least two images. For example, on the basis of the above matching extent, a first dimple pair in the first image and a third dimple pair in the second image, and a second dimple pair in the first image and a fifth dimple pair in the second image may be determined as the first associated dimple pairs, respectively. Further, rotation information of the first associated dimple pair according to one embodiment of the invention may encompass information on an extent of rotation when the first associated dimple pair is matched. For example, when the first dimple pair rotates 30 degrees to match with the third dimple pair, and the second dimple pair rotates 40 degrees to match with the fifth dimple pair, information on the angles of rotation (i.e., 30 degrees and 40 degrees) may be specified as the rotation information.

More specifically, assuming that predetermined rotation (specifically, spin of the ball) occurs with respect to at least one dimple pair in the first image (or at least one dimple pair in the second image), the physical quantity measurement unit 120 may compare and analyze properties of the at least one dimple pair in the first image and properties of the at least one dimple pair in the second image (e.g., regarding whether minimum error occurs) on the basis of, for example, (1) an extent to which a midpoint of the at least one dimple pair in the first image coincides with a midpoint of the at least one dimple pair in the second image. (2) an extent to which a straight line (or line segment) connecting the at least one dimple pair in the first image coincides with a straight line (or line segment) connecting the at least one dimple pair in the second image, and (3) an extent to which a first axis connecting a first dimple of the at least one dimple pair in the first image from a predetermined (or arbitrary) point, a second axis connecting a second dimple of the at least one dimple pair in the first image from the predetermined point, and a third axis specified on the basis of the first and second axes (e.g., a normal axis) coincide with the counterpart axes of the at least one dimple pair in the second image, thereby determining a predetermined number (e.g., five or top 10%) of dimple pairs in the first and second images as the first associated dimple pairs on the basis of the matching extent. More specifically, a total of 45 dimple pairs may be specified when ten dimples are specified in the first image, and a total of 45 dimple pairs may also be specified when ten dimples are specified in the second image as in the first image. The comparison between the properties of each dimple pair may be made 2,025 times (i.e., 45×45 times).

Meanwhile, the physical quantity measurement unit 120 according to one embodiment of the invention may determine a dimple pair in which a distance between the dimples is within a predetermined range, among at least one dimple pair specified from each of the plurality of images, as an effective dimple pair, and may determine the first associated dimple pair on the basis of the effective dimple pair to reduce computational load.

That is, when the distance between the dimples is not greater than a first distance (i.e., the dimples are close at or below a predetermined level), error (e.g., angular error) is likely to increase in the course of comparing the properties of the dimple pairs because the distance between the dimples is quite close, and when the distance between the dimples is equal to or greater than a second distance (the second distance is set to be greater than the first distance) (i.e., the dimples are far apart at or above a predetermined level), a dimple pair with a high matching extent is not likely to be detected in an adjacent image as the ball rotates. Thus, only the dimple pair in which the distance between the dimples is within a predetermined range is determined as an effective dimple pair, and the first associated dimple pair may be determined on the basis of the effective dimple pair. Meanwhile, the predetermined range may be preset or dynamically specified with reference to a probability (e.g., associated with the surface area of the ball) that a dimple pair is detected in an image of the ball.

Further, the dimple pairs specified from the plurality of images according to one embodiment of the invention are not necessarily specified in the entirety of each image as in the above embodiments, and may be specified with respect to a predetermined area in each image as long as the objects of the invention may be achieved, thereby reducing computational load and improving computing speed. The predetermined area in the image may be the same for each image, or may be specified in consideration of a range in which the area may be rotated between temporally adjacent images.

In addition, the physical quantity measurement unit 120 may specify a predetermined rotation range in which rotation may be made between the dimple pairs in the first and second images, and may determine the at least one first associated dimple pair among the those present in the predetermined rotation range. For example, according to one embodiment of the invention, a maximum rotation range of the ball may be calculated per image frame between adjacent images, with reference to a maximum number of rotations of the ball and a frame rate of a camera photographing the ball, and the predetermined rotation range may be specified on the basis of the maximum rotation range.

Further, in order to more accurately specify the physical quantities related to spin of the ball, the physical quantity measurement unit 120 may determine at least one second associated dimple pair among the at least one first associated dimple pair on the basis of the extent of matching between the plurality of dimples in the first and the second images, which is calculated on the basis of the rotation information of the at least one first associated dimple pair, and may measure the physical quantities related to spin of the ball with reference to rotation information of the second associated dimple pair determined as above.

More specifically, when the plurality of dimples in a first image are rotated to an extent to which a dimple pair in the first image among the at least one first associated dimple pair is rotated to a corresponding dimple pair in a second image temporally adjacent to the first image, the physical quantity measurement unit 120 may compare and analyze an extent to which the plurality of dimples in the first image match with the plurality of dimples in the second image to determine a predetermined number (e.g., top 10%) of dimple pairs, among the at least one first associated dimple pair, as the second associated dimple pairs on the basis of the matching extent, and may measure the physical quantities related to spin of the ball with reference to rotation information of the second associated dimple pairs determined as above.

Further, when each dimple specified in the first image is rotated to an extent to which a dimple pair in the first image among the at least one first associated dimple pair is rotated to a corresponding dimple pair in a third image temporally apart from the first image at a predetermined level, the physical quantity measurement unit 120 may compare and analyze an extent to which each dimple specified in the first image matches with each dimple specified in the third image to determine a predetermined number (e.g., top 10%) of dimple pairs, among the at least one first associated dimple pair, as the second associated dimple pairs on the basis of the matching extent, and may determine the second associated dimple pairs specified between the temporally adjacent images with further reference to rotation information of the second associated dimple pairs, or measure the physical quantities related to spin of the ball with reference to the rotation information of the second associated dimple pairs.

Meanwhile, in order to reduce computational load in the course of comparing the extent of matching between the plurality of dimples in the first and second images, the matching extent may be quickly and simply determined by specifying a point at which the at least one first associated dimple pair is present in each image, and comparing and analyzing only the dimples present in the adjacent area around the specified point. For the comparison and analysis based on the adjacent area, various methods may be utilized such as pseudoinverse or singular value decomposition of a matrix. Further, an area in each image may be divided into a plurality of areas on the basis of a theta-phi criterion, an X-Y-Z coordinate criterion, a Fibonacci lattice criterion, and the like, and the adjacent area may be specified around a point where the at least one first associated dimple pair is present.

Next, the communication unit 130 according to one embodiment of the invention may function to enable data transmission/reception from/to the dimple detection management unit 110 and the physical quantity measurement unit 120.

Lastly, the control unit 140 according to one embodiment of the invention may function to control data flow among the dimple detection management unit 110, the physical quantity measurement unit 120, and the communication unit 130. That is, the control unit 140 may control data flow into/out of the measurement system 100 or data flow among the respective components of the measurement system 100, such that the dimple detection management unit 110, the physical quantity measurement unit 120, and the communication unit 130 may carry out their particular functions, respectively.

Figure 5:
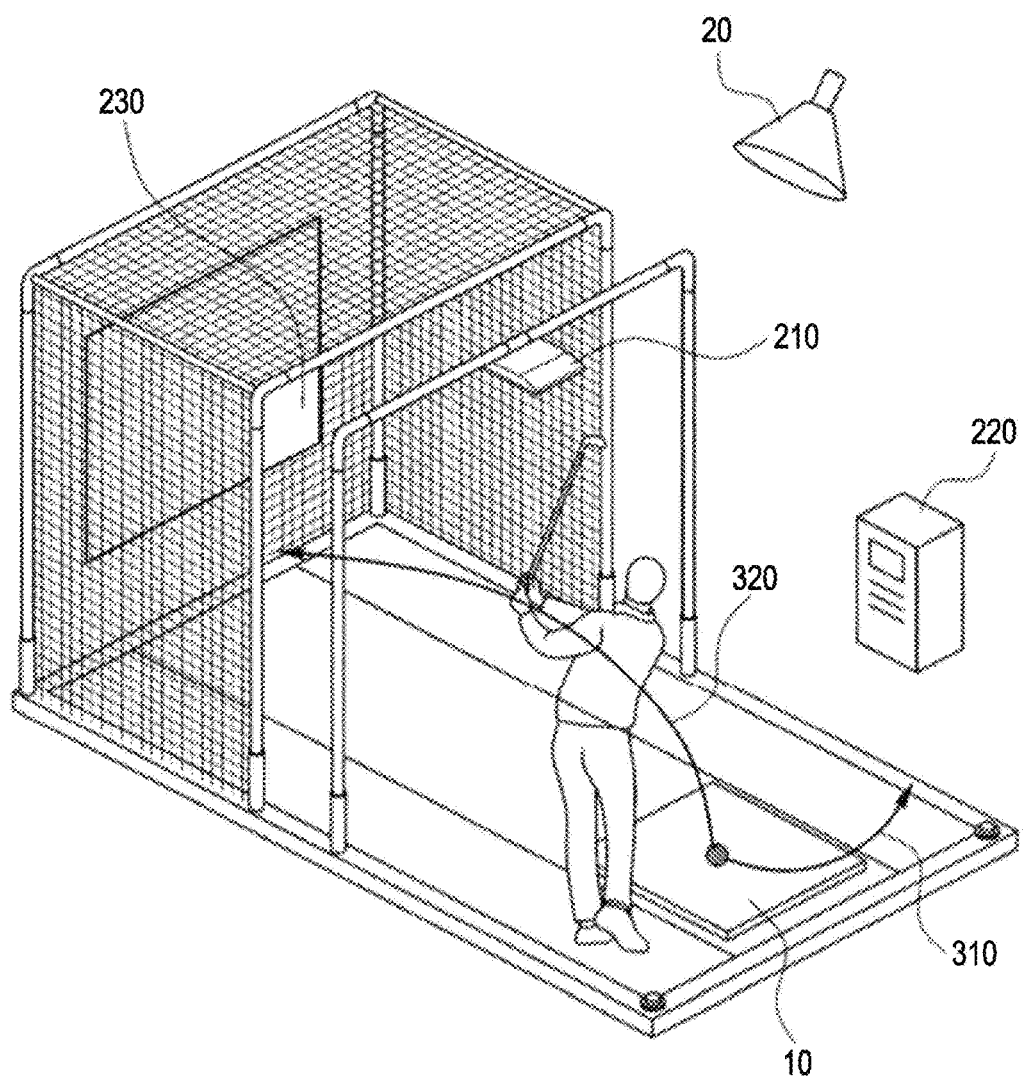
FIG. 5 illustratively shows a situation in which a measurement system according to one embodiment of the invention is utilized in a virtual golf simulation system according to one embodiment of the invention.

FIG. 5 illustratively shows a situation in which the measurement system 100 according to one embodiment of the invention is utilized in a virtual golf simulation system 200 according to one embodiment of the invention.

As shown in FIG. 5, the virtual golf simulation system 200 may comprise a shot unit 10, an illumination device 20, a photographing device 210, a simulator 220, and a display device 230. Further, the simulator 220 according to one embodiment of the invention may include the measurement system 100 according to the invention.

First, the shot unit 10 according to one embodiment of the invention may be a part on which a golfer steps up to place and hit a golf ball when using the virtual golf simulation system 200. The shot unit 10 may include a known swing plate, the tilt angle of which may be adjusted. It is noted that when the invention is applied to other kinds of virtual sport simulation systems, those skilled in the art may modify the configuration of the shot unit 10 (and the configurations of other components associated therewith, if necessary) to suit to the characteristics of the corresponding sports.

Next, the illumination device 20 according to one embodiment of the invention may irradiate light artificially when the golfer plays virtual golf indoors or outdoors. As necessary, the illumination device 20 may be turned on and off, or the brightness thereof may be adjusted. Preferably, the illumination device 20 may be an infrared illumination device (e.g., an LED illumination device) for preventing natural deterioration of golf ball images caused by the flickering of the light.

Next, the photographing device 210 according to one embodiment of the invention may include at least one camera (e.g., a high-speed camera) (not shown) and function to acquire two or more images of the golf ball (e.g., images of the moving golf ball). The photographing device 210 may be placed in a location to look down at the moving golf ball as shown in FIG. 5, while it may be placed in other locations.

Meanwhile, the photographing device 210 according to one embodiment of the invention may function similarly to a high-speed camera by sequentially acquiring images of the golf ball using at least two cameras having different photographing speeds (not shown). That is, in this case, it may not be necessary to have expensive equipment since the at least two cameras need not be synchronized with each other.

Meanwhile, according to one embodiment of the invention, an image of the golf ball may be considered to be better if dimples are clearly formed on the surface of the photographed golf ball such that the dimples may be better specified. For example, if dimples formed in an area corresponding to the ball in the image of the golf ball are clearer, the simulator 220 to be described below may more accurately identify dimples appearing over the plurality of golf ball images, and more accurately calculate physical quantities (e.g., a spin rate and a spin direction) of the golf ball.

Next, the simulator 220 according to one embodiment of the invention may function to detect a plurality of dimples in each of a plurality of images of a ball for which physical quantities are to be measured, and to measure physical quantities related to spin of the ball with reference to a relationship between properties of the plurality of dimples detected in a first image among the plurality of images and properties of the plurality of dimples detected in a second image among the plurality of images.

Meanwhile, the simulator 220 according to one embodiment of the invention may communicate with the photographing device 210 and the display device 230, and may include a dedicated processor for the virtual golf simulation system 200. The dedicated processor may be provided with a memory means and may have capabilities for numerical operations and graphics processing.

Lastly, the display device 230 according to one embodiment of the invention may function to display results of the physical quantity measurement, virtual reality implementation, and the like of the simulator 220. The display device 230 may display images via a display means and, for example, may comprise a screen, which absorbs the impact of the hit golf ball and does not emit light directly, and a projector to output images on the screen.

Hereinafter, it will be discussed how physical quantities related to spin of a golf ball are measured when a user hits the golf ball using the above-described virtual golf simulation system 200.

First, when the golf ball is hit by the user on the shot unit 10 according to one embodiment of the invention, the photographing device 210 may acquire a plurality of images of the hit golf ball.

Next, the simulator 220 according to one embodiment of the invention may perform at least one preprocessing among blur, contrast, adaptive thresholding binarization, and morphology for each of the plurality of images, on the basis at least one filter having a window of a size equal to or similar to the size of a dimple of the ball.

Next, the simulator 220 according to one embodiment of the invention may detect a plurality of dimples on the basis of bright areas (i.e., areas shown brightly due to light applied by the illumination device 20) specified in each of the plurality of images (e.g., five temporally adjacent images) of the ball for which the physical quantities are to be measured.

Next, the simulator 220 according to one embodiment of the invention may compare and analyze properties of at least one dimple pair specified from the plurality of dimples in a first image among the plurality of images, and properties of at least one dimple pair specified from the plurality of dimples in a second image among the plurality of images, thereby determining a plurality of first associated dimple pairs on the basis of the matching extent (e.g., corresponding to the matching extent of top 10%) (i.e., the first associated dimple pairs are determined by a coarse search method).

Next, on the basis of the extent of matching between the plurality of dimples in the first and second images calculated on the basis of rotation information of the plurality of first associated dimple pairs, the simulator 220 according to one embodiment of the invention may determine second associated dimple pairs having the highest matching extent among the plurality of first associated dimple pairs (i.e., the second associated dimple pairs are determined by a fine search method). The first and second images may include images that are temporally adjacent or temporally separate at a predetermined level with respect to acquisition times.

For example, the second associated dimple pairs may be determined between a first image and a second temporally adjacent to the first image among the plurality of images, between the second image and a third image temporally adjacent to the second image among the plurality of images, and between the first image and the third image temporally separate from the first image at a predetermined level among the plurality of images, respectively.

Next, the simulator 220 according to one embodiment of the invention may determine a spin amount and a spin direction of the ball with reference to rotation information of the second associated dimple pair having the highest matching extent among the second associated dimple pairs.

Figure 6:
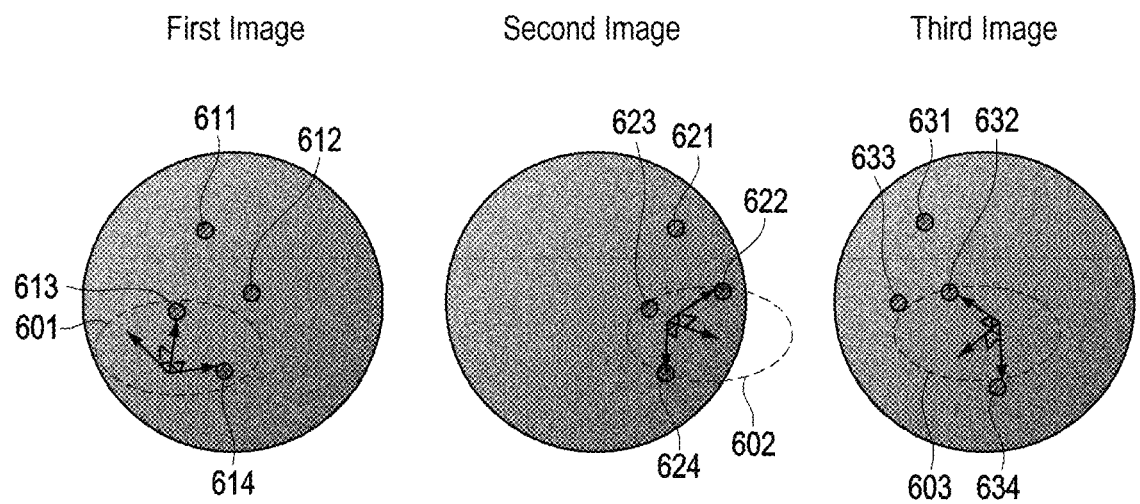
FIG. 6 illustratively shows a situation in which physical quantities related to spin of a ball are measured according to one embodiment of the invention.

FIG. 6 illustratively shows a situation in which physical quantities related to spin of a ball are measured according to one embodiment of the invention.

Referring to FIG. 6, a plurality of dimples may be detected in each of a plurality of images (i.e., a first image, a second image, and a third image) of a ball for which physical quantities are to be measured. The first to third images may be sequentially acquired and temporally adjacent to each other.

Next, a plurality of dimple pairs may be specified from a plurality of dimples in the first image (i.e., dimple 1-1 611, dimple 1-2 612, dimple 1-3 613, and dimple 1-4 614) as pairs of (1) dimple 1-1 611 and dimple 1-2 612, (2) dimple 1-2 612 and dimple 1-3 613. (3) dimple 1-3 613 and dimple 1-4 614. (4) dimple 1-1 611 and dimple 1-3 613. (5) dimple 1-1 611 and dimple 1-4 614, and (6) dimple 1-2 612 and dimple 1-4 614. A plurality of dimple pairs may be specified from a plurality of dimples in the second image (i.e., dimple 2-1 621, dimple 2-2 622, dimple 2-3 623, and dimple 2-4 624) as pairs of (1) dimple 2-1 621 and dimple 2-2 622. (2) dimple 2-2 622 and dimple 2-3 623. (3) dimple 2-3 623 and dimple 2-4 624. (4) dimple 2-1 621 and dimple 2-3 623. (5) dimple 2-1 621 and dimple 2-4 624, and (6) dimple 2-2 622 and dimple 2-4 624. A plurality of dimple pairs may be specified from a plurality of dimples in the third image (i.e., dimple 3-1 631, dimple 3-2 632, dimple 3-3 633, and dimple 3-4 634) as pairs of (1) dimple 3-1 631 and dimple 3-2 632. (2) dimple 3-2 632 and dimple 3-3 633, (3) dimple 3-3 633 and dimple 3-4 634. (4) dimple 3-1 631 and dimple 3-3 633. (5) dimple 3-1 631 and dimple 3-4 634, and (6) dimple 3-2 632 and dimple 3-4 634.

Next, properties of the plurality of dimple pairs specified from the plurality of dimples in the first image (e.g., 601) and properties of the plurality of dimple pairs specified from the plurality of dimples in the second image (e.g., 602) may be compared and analyzed to determine at least one first associated dimple pair on the basis of the matching extent. Further, the properties of the plurality of dimple pairs specified from the plurality of dimples in the second image (e.g., 602) and properties of the plurality of dimple pairs specified from the plurality of dimples in the third image (e.g., 603) may be compared and analyzed to determine at least one first associated dimple pair on the basis of the matching extent. Furthermore, the properties of the plurality of dimple pairs specified from the plurality of dimples in the first image (e.g., 601) and the properties of the plurality of dimple pairs specified from the plurality of dimples in the third image (e.g., 603) may be compared and analyzed to determine at least one first associated dimple pair on the basis of the matching extent. According to one embodiment of the invention, the properties of the dimple pairs may be specified on the basis of a first axis connecting a first dimple of a dimple pair from a predetermined (or arbitrary) point, a second axis connecting a second dimple of the dimple pair from the predetermined point, and a third axis specified on the basis of the first and second axes (e.g., a normal axis).

For example, assuming that predetermined rotation occurs with respect to the plurality of dimple pairs in the first image, the properties (i.e., the above three axes) of the plurality of dimple pairs in the first and second images may be compared and analyzed (e.g., regarding whether minimum error occurs) to determine a predetermined number (e.g., top two) of dimple pairs in the first and second images as the first associated dimple pairs on the basis of the matching extent.

More specifically, according to one embodiment of the invention, the pair of dimple 1-1 611 and dimple 1-2 612 and the pair of dimple 2-2 622 and dimple 2-3 623, and the pair of dimple 1-1 611 and dimple 1-4 614 and the pair of dimple 2-1 621 and dimple 2-4 624 may be determined as the first associated dimple pairs, respectively.

Next, at least one second associated dimple pair may be determined among the at least one first associated dimple pair on the basis of the extent of matching between the plurality of dimples in the first and second images, which is calculated on the basis of rotation information of the at least one first associated dimple pair. Further, at least one second associated dimple pair may be determined among the at least one first associated dimple pair on the basis of the extent of matching between the plurality of dimples in the first and third images, which is calculated on the basis of the rotation information of the at least one first associated dimple pair. Furthermore, at least one second associated dimple pair may be determined among the at least one first associated dimple pair on the basis of the extent of matching between the plurality of dimples in the second and third images, which is calculated on the basis of the rotation information of the at least one first associated dimple pair.

For example, the extent of matching between the plurality of dimples in the first and second images may be calculated for each of the at least one first associated dimple pair, with reference to information on an extent to which the pair of dimple 1-1 611 and dimple 1-2 612 is rotated so that the properties of the pair of dimple 1-1 611 and dimple 1-2 612 match with the properties of the pair of dimple 2-2 622 and dimple 2-3 623. Further, the extent of matching between the plurality of dimples in the first and second images may be calculated for each of the at least one first associated dimple pair, with reference to information on an extent to which the pair of dimple 1-1 611 and dimple 1-4 614 is rotated so that the properties of the pair of dimple 1-1 611 and dimple 1-4 614 match with the properties of the pair of dimple 2-1 621 and dimple 2-4 624. According to the above procedures, the pair of dimple 1-1 611 and dimple 1-4 614 and the pair of dimple 2-1 621 and dimple 2-4 624, which have the highest extent of matching between the plurality of dimples in the first and second images, may be determined as a second associated dimple pair. The above procedures for determining the second associated dimple pair may further be performed for the second and third images and for the first and third images.

Next, the physical quantities related to spin of the ball may be measured with reference to rotation information of the second associated dimple pair determined as above.

Specifically, the physical quantities related to spin of the ball may be measured with reference to rotation information of the second associated dimple pair having the highest matching extent, among the at least one second associated dimple pair determined between the first and second images, the at least one second associated dimple pair determined between the second and third images, and the at least one second associated dimple pair determined between the first and third images.

For example, when the pair of dimple 1-1 611 and dimple 1-4 614 and the pair of dimple 2-1 621 and dimple 2-4 624 are determined as the second associated dimple pair having the highest matching extent among the above second associated dimple pairs, a spin rate, a spin amount, a spin acceleration, and the like of the ball may be calculated with reference to information on an extent to which the pair of dimple 1-1 611 and dimple 1-4 614 is rotated so that the properties of the pair of dimple 1-1 611 and dimple 1-4 614 match with the properties of the pair of dimple 2-1 621 and dimple 2-4 624, and the physical quantities related to spin of the ball may be measured based thereon.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for measuring ball spin, the method comprising the steps of:
   detecting a plurality of dimples in each of a plurality of images of a ball for which physical quantities are to be measured; and
   measuring physical quantities related to spin of the ball with reference to a relationship between properties of the plurality of dimples detected in a first image among the plurality of images and properties of the plurality of dimples detected in a second image among the plurality of images,
   wherein the detecting step comprises the steps of:
   detecting a position of a center of each of bright areas in each of the plurality of images;
   detecting a position of each of the plurality of dimples on the basis of the position of the center of each of the bright areas in each of the plurality of images; and
   correcting the position of each of the plurality of dimples with reference to a direction in which light is applied to the ball in each of the plurality of images.

2. The method of claim 1, wherein in the detecting step, preprocessing for improving discrimination of the plurality of dimples is performed by applying at least one filter having a window of a size equal to or similar to a size of the dimple of the ball to each of the plurality of images.

3. The method of claim 1, wherein in the detecting step, preprocessing for increasing contrast of the plurality of images is performed by applying a filter obtained by increasing a size of a central part of a Gaussian filter at a predetermined level and offsetting the Gaussian filter such that an average of distribution is maintained at a predetermined level.

4. The method of claim 1, wherein the measuring step comprises the steps of:
   comparing properties of at least one dimple pair among the plurality of dimples detected in the first image and properties of at least one dimple pair among the plurality of dimples detected in the second image to determine at least one associated dimple pair on the basis of an extent of matching between the properties; and
   measuring the physical quantities related to spin of the ball with reference to rotation information of the at least one associated dimple pair.

5. The method of claim 1, wherein the measuring step comprises the steps of:
   comparing properties of at least one dimple pair among the plurality of dimples detected in the first image and properties of at least one dimple pair among the plurality of dimples detected in the second image to determine at least one first associated dimple pair on the basis of an extent of matching between the properties;
   determining at least one second associated dimple pair among the at least one first associated dimple pair on the basis of an extent of matching between the plurality of dimples in the first and second images, which is calculated on the basis of rotation information of the at least one first associated dimple pair; and
   measuring the physical quantities related to spin of the ball with reference to rotation information of the at least one second associated dimple pair.

6. A non-transitory computer-readable recording medium having stored thereon a computer program for executing the method of claim 1.

7. A system for measuring ball spin, the system comprising:
   a dimple detection management unit configured to detect a plurality of dimples in each of a plurality of images of a ball for which physical quantities are to be measured; and
   a physical quantity measurement unit configured to measure physical quantities related to spin of the ball with reference to a relationship between properties of the plurality of dimples detected in a first image among the plurality of images and properties of the plurality of dimples detected in a second image among the plurality of images, wherein the dimple detection management unit is configured to:
  detect a position of a center of each of bright areas in each of the plurality of images;
  detect a position of each of the plurality of dimples on the basis of the position of the center of each of the bright areas in each of the plurality of images; and
  correct the position of each of the plurality of dimples with reference to a direction in which light is applied to the ball in each of the plurality of images.

8. The system of claim 7, wherein the dimple detection management unit is configured to perform preprocessing for improving discrimination of the plurality of dimples by applying at least one filter having a window of a size equal to or similar to a size of the dimple of the ball to each of the plurality of images.

9. The system of claim 7, wherein the dimple detection management unit is configured to perform preprocessing for increasing contrast of the plurality of images by applying a filter obtained by increasing a size of a central part of a Gaussian filter at a predetermined level and offsetting the Gaussian filter such that an average of distribution is maintained at a predetermined level.

10. The system of claim 7, wherein the physical quantity measurement unit is configured to:
  compare properties of at least one dimple pair among the plurality of dimples detected in the first image and properties of at least one dimple pair among the plurality of dimples detected in the second image to determine at least one associated dimple pair on the basis of an extent of matching between the properties; and
  measure the physical quantities related to spin of the ball with reference to rotation information of the at least one associated dimple pair.

11. The system of claim 7, wherein the physical quantity measurement unit is configured to:
  compare properties of at least one dimple pair among the plurality of dimples detected in the first image and properties of at least one dimple pair among the plurality of dimples detected in the second image to determine at least one first associated dimple pair on the basis of an extent of matching between the properties;
  determine at least one second associated dimple pair among the at least one first associated dimple pair on the basis of an extent of matching between the plurality of dimples in the first and second images, which is calculated on the basis of rotation information of the at least one first associated dimple pair; and
  measure the physical quantities related to spin of the ball with reference to rotation information of the at least one second associated dimple pair.

* * * * *